(12) United States Patent
Naughton et al.

(10) Patent No.: US 7,560,003 B2
(45) Date of Patent: Jul. 14, 2009

(54) BONDED HYBRID STRUCTURE

(75) Inventors: Pádraig J. Naughton, Hessen (DE); Alexander J. Droste, Nordrheinwestfahlen (DE); Samar R. Teli, Rochester Hills, MI (US); Ashish Kotnis, Rochester Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 158 days.

(21) Appl. No.: 11/361,423

(22) Filed: Feb. 24, 2006

(65) Prior Publication Data

US 2007/0277926 A1    Dec. 6, 2007

Related U.S. Application Data

(60) Provisional application No. 60/656,528, filed on Feb. 25, 2005.

(51) Int. Cl.
*B32B 7/04* (2006.01)
*B29C 65/00* (2006.01)
*B32B 37/00* (2006.01)
*F02F 1/06* (2006.01)
*B60R 19/03* (2006.01)
*B60J 7/00* (2006.01)
*B60K 37/00* (2006.01)
*B60N 2/00* (2006.01)
*B60N 3/00* (2006.01)

(52) U.S. Cl. .................. 156/91; 156/292; 156/303.1; 293/120; 296/187.01; 296/193.01; 296/193.06; 296/203.01; 428/223

(58) Field of Classification Search ............... 156/242, 156/242.22, 292, 293, 298, 303.1, 91; 293/120; 296/70, 193.01, 193.02, 193.06, 203.01, 296/203.02, 203.03, 203.04, 208, 187.01; 428/137, 138, 139, 223
See application file for complete search history.

(56) References Cited

U.S. PATENT DOCUMENTS 4,549,757 A * 10/1985 Minkhorst .................. 293/120

(Continued)

FOREIGN PATENT DOCUMENTS

DE         3122150 A1 *  3/1982

(Continued)

OTHER PUBLICATIONS

Automotive Engineering International; SAE International; 2005 Technology in Review Body Engineering Tools Products of the Year Wire Harnessing, Dec. 2005.

(Continued)

*Primary Examiner*—Jeff H Aftergut
*Assistant Examiner*—Brian R Slawski
(74) *Attorney, Agent, or Firm*—Dobrusin & Thennisch PC

(57) ABSTRACT

The present invention includes devices and methods of forming a structural component of a transportation vehicle and preferably an automotive vehicle. The invention includes a hybrid structure, preferably formed of two or more components that are bonded together with an adhesive to form a structural component that is lighter in weight than that of traditional components formed out of metal. The hybrid component is also substantially free of an over-molding process. Advantageously, one or more snap-fits or the like may be used to position and maintain spatial relationship of the two or more components during assembly, and compression and curing of the adhesive.

5 Claims, 2 Drawing Sheets

U.S. PATENT DOCUMENTS

| | | | |
|---|---|---|---|
| 4,651,815 A * | 3/1987 | Logic et al. ............... | 165/76 |
| 5,154,462 A | 10/1992 | Carpenter et al. | |
| 5,539,070 A | 7/1996 | Zharov et al. | |
| 5,678,826 A * | 10/1997 | Miller ................. | 277/316 |
| 6,033,095 A | 3/2000 | Ognian et al. | |
| 6,227,606 B1 * | 5/2001 | Schroeder et al. ...... | 296/146.1 |
| 6,354,641 B1 * | 3/2002 | Schroeder et al. ........ | 293/155 |
| 6,592,174 B1 * | 7/2003 | Rollin et al. .......... | 296/190.08 |
| 6,630,555 B2 | 10/2003 | Kendall et al. | |
| 6,632,908 B1 | 10/2003 | Maandi | |
| 6,679,540 B1 * | 1/2004 | Graber et al. .......... | 296/146.6 |
| 6,706,831 B2 | 3/2004 | Sonnenschein et al. | |
| 6,710,145 B2 | 3/2004 | Sonnenschein et al. | |
| 6,713,578 B2 | 3/2004 | Sonnenschein et al. | |
| 6,713,579 B2 | 3/2004 | Sonnenschein et al. | |
| 6,730,759 B2 | 5/2004 | Sonnenschein et al. | |
| 6,806,330 B1 | 10/2004 | Sonnenschein et al. | |
| 6,949,603 B2 | 9/2005 | Sonnenschein et al. | |
| 2002/0153743 A1 * | 10/2002 | Cornils et al. ......... | 296/146.15 |
| 2003/0001410 A1 * | 1/2003 | Cate et al. ............. | 296/187 |
| 2005/0004332 A1 | 1/2005 | Jialanella et al. | |
| 2005/0137370 A1 | 6/2005 | Jialanella et al. | |

FOREIGN PATENT DOCUMENTS

| | | |
|---|---|---|
| EP | 1612902 | 1/2006 |
| WO | WO01/44311 | 6/2001 |
| WO | WO02/092711 | 11/2002 |

OTHER PUBLICATIONS

International Search Report PCT/US2006/006555, Jun. 27, 2006.

* cited by examiner

BONDED HYBRID STRUCTURE

CLAIM OF PRIORITY

The present application claims the benefit of U.S. Provisional Application No. 60/656,528, filed on Feb. 25, 2005, which is hereby incorporated by reference.

TECHNICAL FIELD

The present invention generally pertains to improved vehicle components having a hybrid structure.

BACKGROUND OF INVENTION

In view of the ever increasing societal concerns of energy conservation, the transportation industry, particularly the automotive industry, has continually made attempts to reduce and/or minimize the size and mass of vehicle components, while maintaining or increasing the structural integrity. In these attempts, the industry has looked towards alternative designs and materials for meeting these goals.

In one particular aspect, the transportation industry has looked towards the use of alternative materials to replace or supplement certain components of a vehicle typically made of more dense materials, such as metal. For example, certain structural members used for supporting components of the vehicle, which traditionally may comprise of one or more metal components, may instead comprise a hybrid component having a reinforced plastic component and a corresponding adjoined metal component. However, this has led to difficulty in manufacturing, particularly plastic components, as they must be adapted to mate with corresponding metal components and provide the required structural characteristics.

One such manufacturing difficulty arises in over-molding plastic components. As one skilled in the art would appreciate, over-molding can be much more costly than the conventional injection-molding process, since it requires extra components and additional molding steps. Another difficulty arises since moldings are open structures, where a substantial portion of the over-molded hybrid component is generally open along an axis, thereby resulting in a member having diminished strength and stiffness.

Accordingly, there is a need for a method of forming lightweight structural members with more efficient techniques which deliver maximum performance for reduced costs and weight. Furthermore, there is a need for vehicular structural members that are lighter than traditional structural members without substantially increasing cost of producing the same.

SUMMARY OF THE INVENTION

The present invention includes devices and methods of forming a structural component of a transportation vehicle and preferably an automotive vehicle. The invention includes a hybrid structure, preferably formed of two or more components that are bonded together with an adhesive to form a structural component. The hybrid structure preferably is lighter in weight than that of traditional structural and is also made without an over-molding process.

In one aspect, the methods include forming a structural component for a vehicle by forming a first plastic component with or without ribs and one or more engagement features. The methods also include forming a second metal component adapted to engage with the first component. The first and second components are adhered together with an adhesive. One or more engagement features, such as a snap fit fastener or the like, may be used to align and/or spatially locate the components relative to each other. Preferably, the forming of the first and second component is substantially free of an over-molding process.

DETAILED DESCRIPTION

The present invention is based upon devices and methods which reduce the overall mass of structural components while maintaining or improving the strength of the same. A reduction in packaging space requirements and costs may also be achieved. The present invention includes a hybrid structure having two or more components that are formed and adhered together, without the use of an over-molding process.

Figure 1:
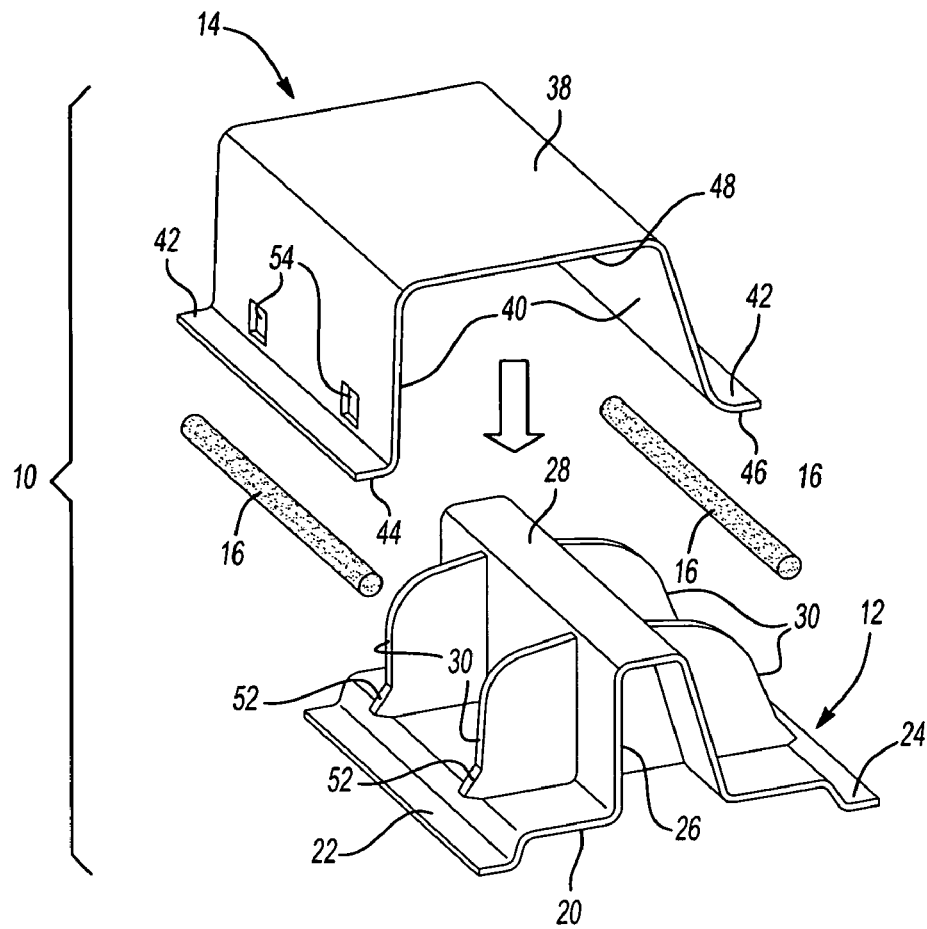
FIG. 1 illustrates an exploded perspective view of one embodiment of a structural component formed by the teachings of the present invention.
Figure 2:
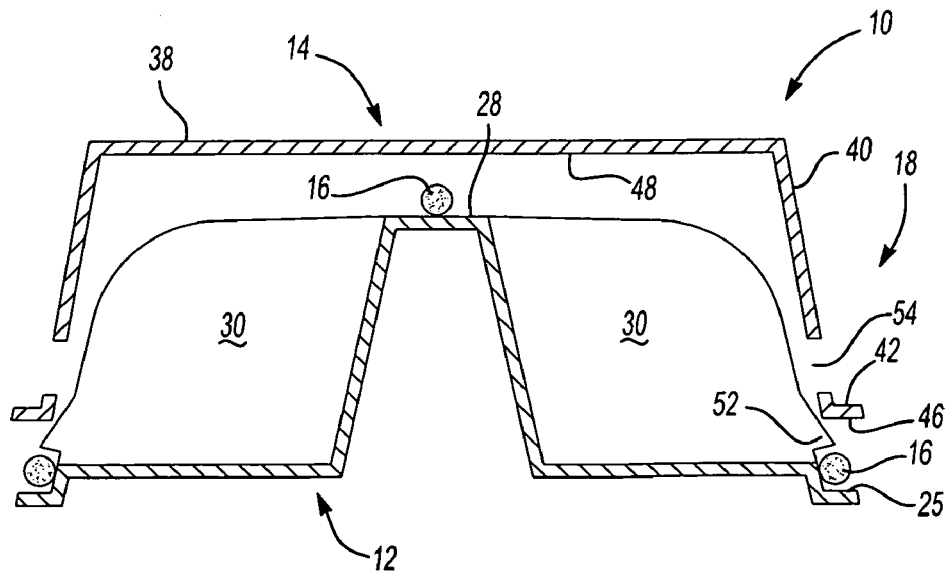
FIG. 2 illustrates an exploded cross sectional view of the embodiment shown in FIG. 1.
Figure 3:
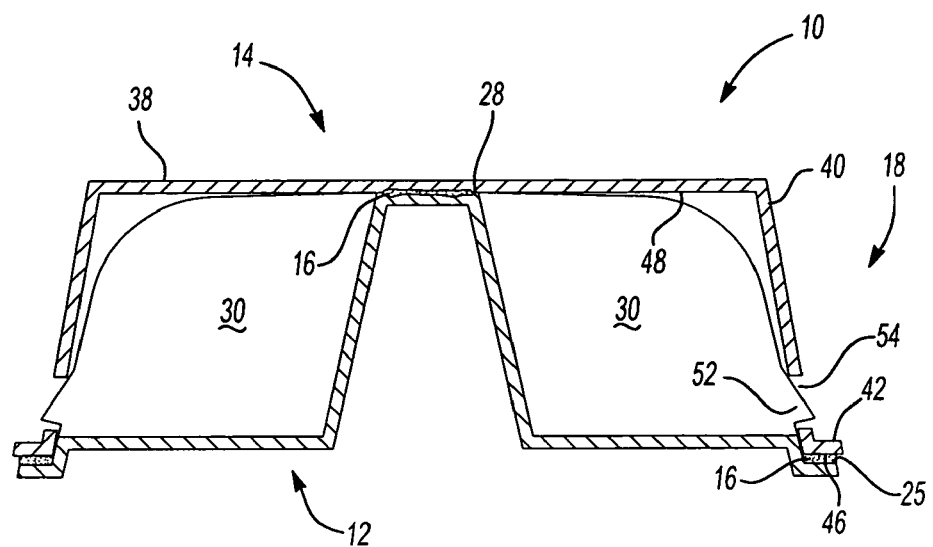
FIG. 3 illustrates an assembled cross sectional view of the embodiment shown in FIG. 1.

Referring to FIGS. 1-3, a hybrid structure 10 made according to the teachings of the present invention is illustrated. In general, forming the hybrid structure includes joining a first component 12 and a second component 14 along two, three or more bonding surfaces of the first and second component using an adhesive material 16. Preferably, the joining of the bonding surfaces of the first and second components results in the forming of two, three or more joints. Optionally, the method further includes the use of one or more attachment features 18 for aligning and maintaining a spatial relationship between the first and second components, particularly during assembly of the hybrid structure or curing of the adhesive.

As seen in FIGS. 1-3, the first component 12 may include a base portion 20 having a first bonding surface 22 and a second bonding surface 24 located opposite one another, which reside substantially on the same dimensional plane. Preferably, the first and second bonding surfaces are adapted to receive an adhesive and form a first and second bond with the second component. Optionally, the first and second bonding surfaces may be recessed, with respect to the remainder of the base portion, for facilitating the placement of the adhesive and improving strength of any joint formed there between.

Extending from the base portion, the first component further includes one or more intermediate portions 26, located between the first and second bonding surfaces. The intermediate portion is adapted to provide additional strength to the structural component and/or to provide one or more additional bonding surfaces for joining with the second component. As seen in FIG. 1-3, the intermediate portion is a ridge that runs at least a portion of the length of the first component and may include a third bonding surface 28. Preferably, the third bonding surface resides on a different plane than that of the first and second bonding surfaces.

Optionally, the first component may include one or more reinforcing features for improving the rigidity and/or strength of the component. The reinforcing features may result in the formation of valleys, ridges, grooves, or other surface features, in one or more portions of the first component. Such features may include one or more, and preferably a plurality, of reinforcing ribs 30. In one aspect, the reinforcing features connect or integrate the base portion of the first component to the intermediate portion, thus providing additional rigidity. In another aspect, the reinforcing feature may be connected or integrated with different portions of the intermediate portion, such as interior portions, which may or may not be additionally connected or integrated with the base portion. In yet another aspect, the reinforcing features define a contoured shape that will generally be complimentary to the shape of the other component. Such a configuration may provide increased crush resistance and stiffness to the structural component. Any reinforcing feature that accomplishes one, both or other goals may be suitable.

The intermediate portion may further include one or more surface features for improving the strength or rigidity of the ribs, or otherwise, and inherently the structural component. Such features may include dimples, raised portions, recessed portions, or otherwise. For example, one or more surface features may be formed, via a pattern or randomly, on a portion or the entire surface of one or more reinforcing ribs. The forming of the surface features may be achieved during the forming of the first component. Alternatively, the forming of the surface features may be achieved in a subsequent operation. Of course, it should be appreciated that surface features may also be formed on other portions of the first component and/or on the second component.

The orientation of the reinforcing features is generally used to optimize the performance under the critical load conditions for the member and to accommodate other functional requirements (e.g. locating or fixing of further components). In one preferred embodiment, as seen in FIGS. 1-3, the reinforcing features may be ribs that are generally perpendicular to the base portion and connect the base and intermediate portions. In addition, the ribs may extend lengthwise, widthwise or combinations thereof along the first component. Furthermore, the reinforcing ribs may extend in a straight configuration, arcuate configuration or combinations thereof. For example, the reinforcing ribs may comprise circular portions extending from the molded component. Still further, the reinforcing ribs may extend in a pattern using any combinations described above or otherwise. It should also be appreciated that the ribs may extend in any number of directions and may be joined with other ribs to form a matrix, array, or other pattern.

As shown in drawings, the second component may include a base portion 38 having outwardly extending resilient projections 40 and flanges 42 extending therefrom. The second component includes a first and second bonding surface 44, 46 located on flanges 42. The second component also includes a third bonding surface 48 located on the base portion. Advantageously, the first, second and third bonding surfaces 44, 46, 48 are complementary to the first, second and third bonding surfaces 22, 24, 28 of the first component.

The components further include one or more attachment features 18 that help ensure the appropriate connection of components, while maintaining the spatial orientation of the components to each other. Any suitable mechanical fastener may be used, with snap fit fasteners being preferred. In one preferred configuration utilizing a snap fit fastener, seen in FIGS. 1-3, the attachment feature includes one or more male portions 52 extending from the first component. In a preferred embodiment, the male portion is located on one or more of the reinforcing ribs. The attachment feature also includes one or more female portions 54 formed in the second component. As the second component 14 is moved into position on the first component 12, the male portion 52 guides and forces the sides of component 10 elastically outwards and in a defined trajectory to allow them to spring back to the final position, in so doing to compress the adhesive and push it into shape without smearing. During spring back of the first component, the adhesive may be pushed towards the intermediate portion of the first component, which improves application of the adhesive along the width of the first and second bonding surfaces 22, 24. The male and female portions cooperate to hold the components together in the desired alignment while maintaining the desire spatial orientation of the two components. For example, the first and second components may be prevented from abutting at their bonding surfaces. Maintaining spatial orientation permits the adhesive to have a consistent thickness along the bonding surfaces, which leads to better bond strength.

Other attachment features may also be used to ensure proper alignment or spatial orientation of the components. For example, spacer ribs may be located periodically along the length of the bonding surfaces, where the height of the ribs is selected to be the desired minimum thickness of the resultant adhesive joint. Such a feature may prevent weakened adhesive bonds due to over compression of the joint before or during curing.

The components may include mounting features for attaching the component to another component, frame member, or other structure, such as a vehicle frame. Typically, the mounting features will comprise, or will facilitate the use of, mechanical fasteners such as snap-fit devices, nut-and-bolts, screws, rivets or the like. Preferably, the mounting features are integrated in the design of the components. However, they may be separately formed and attached to the components.

The components may comprise other features to accomplish a variety of goals. Components may be surface treated, primed, coated or comprise additional layers of materials, combinations thereof, or the like. Suitable surface treatments include any of a number of techniques that alter the molecular state of a polymer in the component, a technique that bonds a material having the desired surface characteristic to the component, or a combination thereof. By way of specific example, one or any combination of a suitable corona treatment, flame spray treatment, or surface coating treatment may be employed. Suitable coatings include e-coating for metals. Suitable primers may be selected based on the selected adhesive. In one embodiment, at least one of the components is surface treated to achieve a desired surface energy. In another embodiment, only one of the components is surface treated. Preferably, an adhesion promoter such as primer is not used on a component made of plastic.

The first component may be formed using common molding techniques. Such molding techniques include blow molding, rotational molding, transfer molding, compression molding, injection molding, insert molding or the like. In a preferred method, forming the first component comprises an injection molding process and is substantially free from overmolding. Preferably, during molding of the first component, three or more mating surfaces are formed. Furthermore, preferably the molding process further includes the molding of a plurality or reinforcing ribs.

Without limitation, components can be formed from plastics (e.g., thermoplastics, thermosets, combinations thereof, or the like), metals (e.g., steel, aluminum, combinations thereof, or the like), glass, ceramics, combinations thereof, or the like.

Preferably, the material of the first component has a high strength to weight ratio. Accordingly, the first component preferably comprises a polymeric material. In a particularly preferred embodiment, at least one of the components includes a high strength thermoplastic and/or thermoset resin selected from styrenes, polyamides, polyolefins, polycarbonates, polyesters, polyvinyl esters, mixtures thereof or the like. Still more preferably they are selected from the group consisting of acrylonitrile butadiene styrene (ABS), polycarbonate/acrylonitrile/butadiene styrene, polycarbonate, polyphenylene oxide/polystyrene, polybutylene terephthalate (PBT), polyphenylene oxide, polyphenylene ether, syndiotactic polystyrene, ethylene alpha olefin, polybutylene terephthalate/polycarbonate, polyamide (e.g., nylon), polyesters, polyurethane, sheet molding compound (SMC) (e.g., polyesters, polyvinyl esters), thermoset polyurethane, polypropylene, polyethylene (e.g., high density polyethylene (HDPE)), poly acrylics, and mixtures thereof or the like. More preferably, at least one of the components comprises a polypropylene.

It is also contemplated that all of the polymeric materials above may be fiber reinforced or otherwise reinforced with ceramic, glass, polymer, natural synthetic or other fibers. According to one preferred embodiment, for reinforcement, the polymeric materials include relatively long glass fibers that are between approximately 0.1 mm and approximately 30.0 mm in length. More preferably, the fibers are between approximately 0.5 mm and approximately 20.0 mm in length. Most preferably, the fibers are between approximately 0.7 mm and approximately 15.0 mm in length. It is also contemplated that one or more fillers may be included with the polymeric materials.

The second component may comprise of any suitable material for forming the hybrid structure with first component. It is contemplated that the material of the first and second components may be the same but preferably they are different. The material may be selected to have a lower strength to weight ratio than the first component. Typically, such materials will be denser than those used for the first component. Preferably, the material of the second component is metal and more preferably steel. Preferably the first component may comprise a substantial portion of the resulting structural component. In another embodiment, it is contemplated that the second component comprises an additional structural layer applied to the first molded component to provide additional structural support or other advantageous properties as discussed with the second component. In one preferred embodiment, the second component is formed of a rigid structural component, which conforms in shape, to at least in a portion of the first component.

The second component may be formed using suitable techniques for the material of the second component. For example, metal components may be molded or stamped as appropriate.

The present invention further contemplates forming a structural member using one or more additional components (e.g., three or more components). Such component may comprise any of the components discussed herein. For example, the present invention may include a third component accordingly to the teachings of the first component, second component, or otherwise. Accordingly, the first or second component may include yet additional surfaces or features for joining with a third component or otherwise.

Accordingly, with particular reference to FIGS. 2 and 3, when the first component is attached to the second component one or more cavities may be formed between the first and second bonding surfaces and the third bonding surface.

An adhesive is used to adhere the first component to the second component. In one preferred embodiment, at least three adhesive joints are formed between the first and second components by applying adhesive to one or the other of the bonding surfaces on components. The adhesive may be continuous or intermittent along the bonding surfaces. The adhesive may be sprayed, dipped, or otherwise applied to one or both of corresponding bonding surfaces of the first and second components.

The adhesive of the present invention may optionally be a structural adhesive, a cure on demand material, or both. The adhesive needs to be capable of achieving a flowable state in the desired manufacturing environments for the bonded article. The adhesive may be soluble in low vapor pressure solvents (e.g., alcohols, ethers, acetone, benzenes, methanes, ethanes, combinations thereof, or the like), melt flowable (e.g., melt flowable, flowable at room temperature, and the like), preferably at temperatures between approximately 100° C. (212° F.) and 240° C. (464° F.), foamable, combinations thereof, or the like. Preferably, the adhesive is flowable at temperatures between about −20° C. to about 240° C.; more preferably, between about −5° C. and about 160° C.; and most preferably, between about 10° C. and 60° C. a melt flowable adhesives should have a melting temperature substantially below the temperature at which the components to be bonded lose structural integrity (e.g., between 5° C. and 30° C.).

Preferred adhesives include those that, after cure, can withstand the operating conditions of an automotive vehicle. Preferably, such an adhesive does not decompose or delaminate at temperatures of up to about 140° C. (284° F.), more preferably up to about 150° C. (302° F.), and even more preferably, greater than up to about 160° C. (320° F.) and most preferably up to about 200° C. (392° F.). Though not critical, in one embodiment, the adhesive that is employed in a joint herein has a resulting tensile strength of at least about 500 kPa (about 72 psi), more preferably about 1 MPa (about 145 psi), still more preferably about 3 MPa (about 435 psi). In some applications, such as where a structural adhesive is used, the resulting tensile strength may be as high as about 30 MPa (about 4350 psi), more preferably at least about 45 MPa (about 6530 psi), and still more preferably at least about 60 MPa (about 8700 psi).

Furthermore, the preferred adhesive is capable of withstanding prolonged exposure to the ambient operating conditions of the bonded article. For example, preferred adhesives include those that can withstand prolonged exposure to hydrocarbon materials, sodium chloride, calcium chloride, other salts, brake fluid, transmission fluid, glycol coolants, windshield washer solvents, detergents, and the like, at ambient conditions or at the above-mentioned temperatures and the pressures.

The adhesive can comprise any number of components; but preferably comprises two components. While other adhesive families are contemplated as well (e.g., urethanes, silanes, or the like), the preferred adhesive comprises one or more polyurethane based adhesives, epoxy resins, phenolic resins, polyimides, hi-bred polyimide/epoxy resin adhesives, acrylic resins, or epoxy novolac/nitrile rubber adhesives. Preferably, the adhesive is one that is flowable at room temperature and bonds low energy substrates; more preferably, the adhesive comprises a polyurethane or acrylic based adhesive; and most preferably, the adhesive is a Betamate LESA adhesive such as those disclosed in U.S. Pat. Nos. 6,710,145, 6,713,579, 6,713,578, 6,730,759, 6,949,603, 6,806,330 and U.S. Patent Publications 2005-0004332 and 2005-0137370, which are incorporated by reference. Other suitable adhesives include those disclosed in U.S. Pat. Nos. 5,539,070; 6,630,555; 6,632,908; and 6,706,831, which are incorporated by reference.

Compositions for possible adhesives are disclosed in a patent application titled, "Amine Organoborane Complex Polymerization Initiators and Polymerizable Compositions", PCT Publication No. WO 01/44311 A1, U.S. Ser. No. 09/466, 321, herein incorporated by reference.

Adhesive may be used in the presence of primers or other adhesion promoting layers applied to one or more of the components, although preferably the adhesive is used in the absence of a primer or other pretreatment on the plastic component.

The hybrid structure of the present invention may be used to form numerous structural components. However, one particularly advantageous field comprises transportation vehicles. Accordingly, numerous structural and nonstructural components of a vehicle can be formed with the teachings of the present invention. In particular, with regards to the automotive industry, the method of the present invention can be used to form components such as front-end carrier assemblies, cross-car beam assemblies, tailgate/liftgate assemblies, door assemblies, water conductor assemblies, radiator end tank assemblies, oil pan assemblies, engine intake manifold assemblies, valve cover cylinder head assemblies, exhaust system components, exterior trim, interior trim, structural supports, or combinations thereof.

Figure 4:
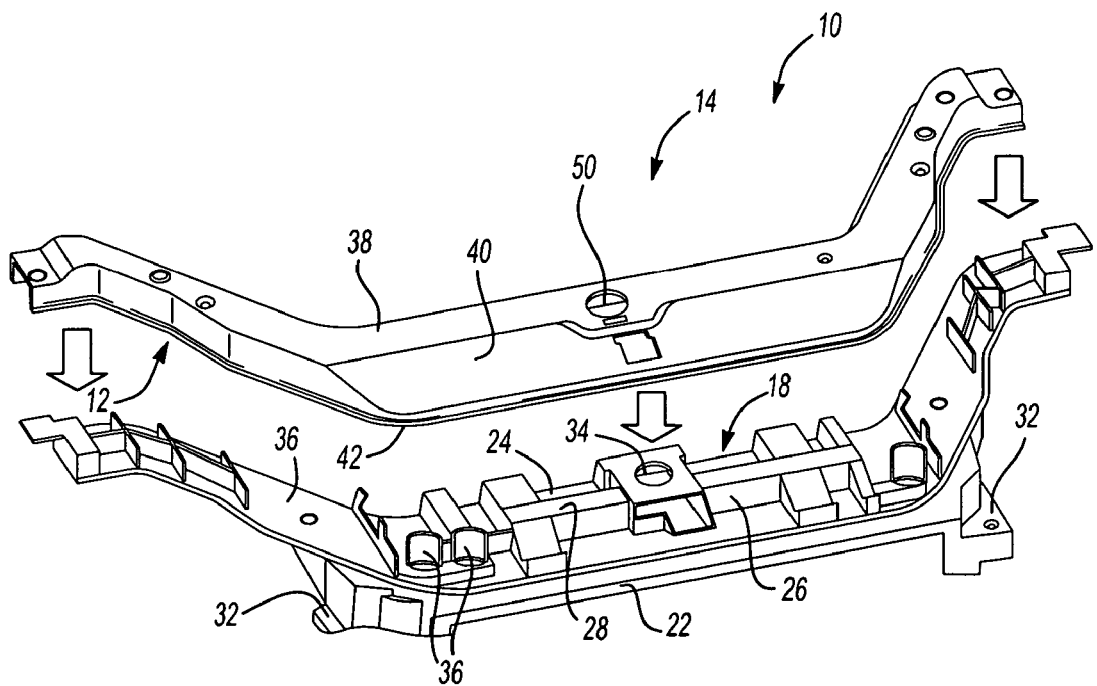
FIG. 4 illustrates an exploded perspective view of another embodiment of a structural component of the present invention.

FIG. 4 illustrates a hybrid structure in the form of a front end carrier of an automobile. In this configuration, the front end carrier 10 includes a first molded plastic component 12 and a second metal component 14. The first component includes a first, second and third bonding surface 22, 24, 28 adapted for receiving an adhesive 16 and forming a three or more joints with the first, second and third bonding surfaces 44, 46, 48 of the second component.

The first component includes one or more intermediate portions 26 at center for additional bending stiffness and flat surface at outboard ends for torsion stiffness. Other features include additional reinforcing features, such as reinforcing ribs 30, for increasing the strength and stiffness of the first component. Still other available features include one or more mounting feature 32 for mounting the component to a frame member of the automobile. Still other features include one or more apertures 34 for receiving and optionally mounting a latching mechanism for an automotive hood or otherwise. Still other features include one or more additional apertures 36 for receiving other component, providing a drainage opening, reducing the mass of the component, facilitating in manufacturing, strengthening the first component (e.g., with the use of an arcuate rib 30), or otherwise.

In forming the structural component, the first and second components are joined together via the first, second and third mating surfaces of the first and second components. As previously discussed, as the components are assembled into the structural component, the attachment feature 18 aligns and maintains a spatial distance between the bonding surfaces of the first and second components. Accordingly, the adhesive joint formed between the bonding surfaces comprises a substantially uniform thickness.

It will be further appreciated that functions or structures of a plurality of components or steps may be combined into a single component or step, or the functions or structures of one-step or component may be split among plural steps or components. Unless stated otherwise, dimensions and geometries of the various embodiments depicted herein are not intended to be restrictive of the invention, and other dimensions or geometries are possible. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

Reference herein to "first" and "second" are not intended as limiting to combinations that consist of only first and second items. Where so-referenced, it is possible that the subject matter of the present invention may suitably incorporate third, fourth or more items. Moreover, the disclosure of "a" or "one" element or step is not intended to foreclose additional elements or steps. Use of the term "about" or "approximately" in advance of a range denotes that both the upper and lower end and not intended as being bound by the amount recited in the range (e.g., "about 1 to 3" is intended to include "about 1 to about 3"). Unless otherwise stated, or as dictated otherwise by the context of usage, references to "mixtures" or "combinations" of polymers contemplates alloys, blends or even co-polymers of such polymers. "Comprising", "having", and "including" and their word forms also contemplate the more restrictive terms "consisting of" and "consisting essentially of".

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method of forming a structure comprising:
   a. forming a first plastic component including a plurality of bonding surfaces, at least one or more first component attachment features located on one or more reinforcement ribs, wherein a male portion of the first component attachment feature is disposed upon at least one of the reinforcement ribs;
   b. forming a second component with a plurality of bonding surfaces and a second component attachment feature with a female portion corresponding to the male portion of the first component attachment feature, wherein the second component has a lower strength to weight ratio than the first component;
   c. applying an adhesive to the bonding surfaces of the first component, the second component, or both;
   d. moving the first and second component together causing the male portion of the first component attachment feature to deflect the second component elastically outward and in a defined trajectory;
   e. moving the first and second components together until the male and female portions mate and allow the second component to spring back to a final position, in so doing to compress the adhesive and push it into shape.

2. The method according to claim 1, wherein the applying step comprising applying the adhesive to the bonding surfaces of only the first component.

3. The method according to claim 2, including the step of pushing the adhesive towards the intermediate portion of the first component by the spring back of the second component.

4. The method according to claim 1, wherein the structure is selected from the group consisting of a front-end carrier assemblies, cross-car beam assemblies, tailgate/liftgate assemblies, door assemblies, water conductor assemblies, radiator end tank assemblies, oil pan assemblies, engine intake manifold assemblies, valve cover cylinder head assemblies, and exhaust system components.

5. The method according to claim 1, wherein the structure is a front-end carrier assembly.

* * * * *